June 27, 1967  J. A. SOULES ETAL  3,328,112
FAST LASER SWITCH
Filed Sept. 3, 1963

INVENTOR
JACK A. SOULES
FRANCIS T. BYRNE

BY
AGENT

ATTORNEY 3,328,112
FAST LASER SWITCH
Jack A. Soules, 870 N. Arlington Mill Drive, Arlington, Va. 22205, and Francis T. Byrne, 123 Hamilton Ave., Silver Spring, Md. 20901
Filed Sept. 3, 1963, Ser. No. 306,397
5 Claims. (Cl. 350—285)

ABSTRACT OF THE DISCLOSURE

The device of the present invention is directed to a rotating switch for use in a Q-spoiled laser. The device includes three separate compartments with the center compartment enclosed at the ends with a right angle prism. The compartments are filled with a gas having the same pressure in each compartment wherein the gas in the center compartment has an index of refraction which is greater than that of the gas in the outer compartments. Means is provided for rotating the device about its axis extending in the direction of elongation of the device.

---

The invention described herein may be manufactured and used by or for the Government of the United States of America for governmental purposes without the payment of any royalties hereon or therefor.

The present invention is directed to a laser switch and more particularly to a fast laser switch.

The operation and use of laser systems have been discussed in the literature and are well known in the optical field today. Some systems make use of a single laser element whereas other systems make use of a series of laser elements in optical alignment.

High power avalanche laser systems require some practical method of switching the optical material into a connected configuration in a very short time. Glass, ruby or other optical energy storage material must be connected in series in a time of the order of about $10^{-8}$ seconds in order that a spontaneously emitted photon can trigger an entire sequence into emission without prematurely dumping one unit of the sequence. Heretofore various switch schemes have been proposed such as: rotating toothed wheels or choppers, piezoelectric frustrated reflection modulators, and rotating mirrors. Most of these switches are easily synchronized since a single means triggers all switches between a series of laser units. Existing switch designs require a turn-on time in the order of from 1–10 microseconds, which is much too long to permit holding all laser units in the off condition until all of the units are triggered. The minimum time required to switch a laser unit is about $10^{-8}$ sec. Thus it is seen that existing switches are not fast enough to suitably switch on a laser unit in the time required.

It is therefore an object of the present invention to provide a fast laser switch suitable for turning-on a laser unit.

Another object is to provide a laser switch which is a of simple construction, and easily operated with a sufficiently fast turn-on time of about $10^{-8}$ sec.

Yet another object is to provide a switch which is useful for a Q-spoiled laser.

Figure 1:
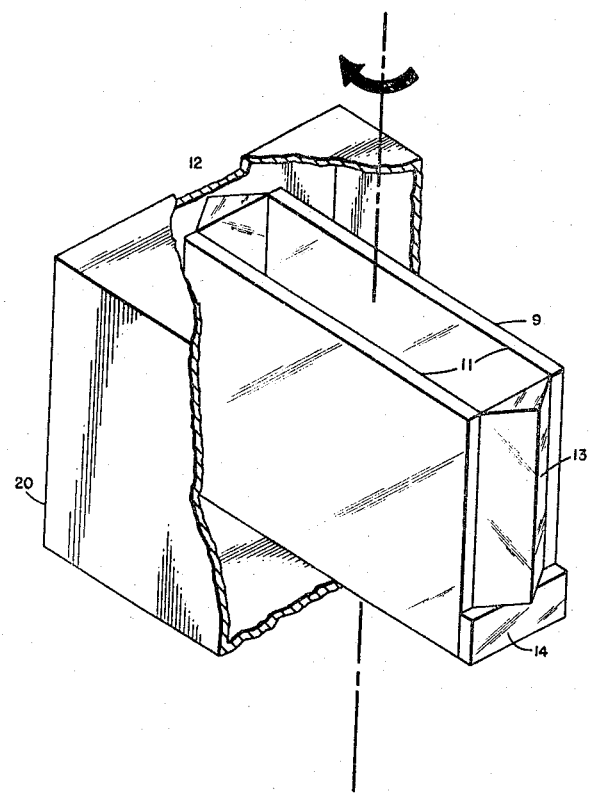
Figure 2:
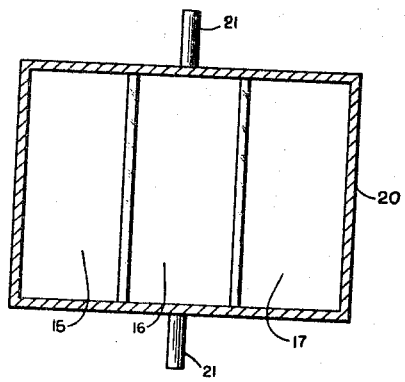

Other and more specific objects of this invention will become apparent upon a careful consideration of the following detailed description when taken together with the accompanying drawings, in which:

FIG. 1 illustrates a switch structure partly cut away to illustrate the relative parts; and FIG. 2 illustrates a cross sectional view of the relative parts.

The device of the present invention is directed to a rotating optical switch for use in a Q-spoiled laser. The switch includes one type of gas such as nitrogen confined in an area by parallel glass plates on the sides with right angle prisms at the ends and a container connecting with the glass plates and right angle prism. An area on opposite sides of the nitrogen confining area formed by the glass plates and the container walls contains the same type of gas such as oxygen or other gas that has a lower index of refraction than that of the center area. Light enters the device below one of the right angle prisms and is reflected back and forth across the center area between the right angle prisms as the device is rotated. This switch device takes advantage of the asymmetry of the internal reflection factor when an optical beam in a dense medium is reflected from a planar interface with a less dense medium. Total internal reflection occurs at a certain angle $\phi$, determined by the relative indices of the media $$N = \left(\frac{n_1}{n_2}\right)$$

according to the formula:

$$\sin \phi = \frac{1}{N}$$

where N is the relative index. For angles less than $\phi$ partial reflection occurs. It has been determined that for a relative index of refraction $n=1.000030$, the reflectance is 78% when the light rays or beam is 60 microradians away from the critical angle of approximately 85 degrees. Thus fourteen reflections of a light beam in the switch at this angle reduces the intensity by about $\frac{1}{1000}$. Therefore the transmitted intensity of the beam changes from $\frac{1}{1000}$ to 1 in an angle of 60 microradians requiring a rotation of the switch device at an angular velocity of 6000 radians per seecond or approximately 1000 revolutions per second. Such a rotating switch achieves a switching time of $10^{-8}$ seconds.

Referring now to the drawing, there is shown by illustration in FIGS. 1 and 2 suitable structure for carrying out the invention. FIG. 1 illustrates the inner structure which includes a pair of rectangular glass plates 11 spaced from each other and assembled in parallelism. A right angle prism 12 with corner reflectors separates the glass plates at one end and has a length that extends the entire width of the glass plates. A right angle prism 13 with corner reflectors separates the plates at the opposite end. The prism 13 is shorter than the width of the parallel plates and is secured with the upper edge even with the upper edge of the parallel plates. A plain optical glass plate 14 extends downwardly from the right angle prism to the lower edge of the parallel plates at an angle relative to the bottom face of the prism. The plain glass 14 forms an entrance for a light beam into the switch therefore the angle of the plain glass 14 is set at the proper angle to be perpendicular to the path of a desired entrance beam of light. The role of the glass plates is purely passive so long as they are plane parallel and free of inhomogeneity.

The parallel glass plate, right angle prism arrangement is secured within a high pressure container or housing 20 such as show in cross section in FIG. 2. The upper and lower edges are secured to the inner surface of the container wall such that three separate areas 15, 16 and 17 are formed. The container can take any shape such as a can or a box-shape. For low pressures a box-like container is satisfactory and the ends of the right prism will join the upper and lower surface of the container. If high pressures are required a cylindrical container should be used; however additional end structure is required between the container and the right prism to close off the end.

Gases of different index of refraction are admitted into the three separate areas with the two outer areas having the same type of gas such as oxygen with an index of refraction, $N_2$, of 1.000272 at atmospheric pressure with the center or middle area having a different gas such as nitrogen with an index of refraction, $N_1$, of 1.000296 at atmospheric pressure. For satisfactory operation of the device the gases in the middle area must be at a higher index of refraction than the outer side areas and the pressure of all three areas must be maintained at the same pressure; therefore, any means well known in the art can be used for this purpose. Such means being a bellows arrangement, a mercury-capillary tube or any other arrangement. Also the index of refraction of the gases can be varied, if desired, by changing the pressure of the gases within the container.

In operation of the device, it is necessary that the device be rotated; therefore, rotating shafts 21 are secured at the mid-point or center of gravity of the container such that the device can be rotated with the longitudinal axis perpendicular to the axis of rotation at a fast rate without any vibrations etc.

In operation of the device as a rotating optical switch for use in a Q-spoiled laser, the switch is positioned in optical alignment with a single laser or in optical alignment between successive lasers in a series of optically aligned lasers. The light beam must enter the switch through entrance 14 at an angle of approximately cos 1/20 (approx. 87°) to the rotational axis in order to climb up the right angle prism reflectors without interfering with the incident beam. For a switching time of $10^{-8}$ seconds, the device is rotated at an angular velocity of 6000 radians per second or approximately 1000 revolutions per second.

The light beam from one laser enters the device through the plane glass 14 secured at the bottom of right prism 13 at the proper angle. The light beam traverses through the nitrogen gas area to the "back" right angle prism 12 which returns the beam by reflection to the "front" right angle prism 13 which similarly returns the beam back to the "back" right angle prism. Since the beam enters at an angle relative to the back right angle prism the beam climbs the right angle prism on each traversal until it gets to the top or corner reflector. The corner reflector returns the beam along its path back and forth between the right angle prisms. After fourteen traversals between the "back and front" right angle prisms, the beam is permitted to emerge through the entrance. In the case of a single laser, the beam is returned to the single laser element. However, if there are a series of laser elements the beam is directed to the next laser element in the optical chain. The total transit time of the beam in the switch device is approximately five (5) nanoseconds, thus with a rotation of about 1000 revolutions per second a switching time of about $10^{-8}$ seconds is achieved.

When using the switch with a single laser, the switch can be rotated such that the longitudinal axis of the switch is at about three (3) degrees relative to the longitudinal axis of the laser so that the light beam from the laser will enter the switch and return to the laser. When used with a plurality of lasers in an avalanche, the switch is positioned in any suitable optical alignment relative to the lasers to suit the system so long as the light beam enters the switch at the correct angle.

The switch has been shown with the light beam entering and emerging at the same optical opening; however it is obvious to those skilled in the art that the light may enter and emerge on opposite sides of the same end or either enter on one end and exit on the opposite end.

Further it will become obvious that a single rotating switch may have a plurality of so constructed switches for handling a plurality of beams by use of a single rotating switch.

Obviously many modifications and variations of the present invention are possible in the light of the above teachings. It is therefore to be understood that within the scope of the appended claims the invention may be practiced otherwise than as specifically described.

What is claimed is:
1. An optical switch which comprises:
 (a) an elongated housing having side and end walls,
 (b) said housing comprising two parallel glass partitions therein extending in the direction of elongation of said housing,
 (c) said parallel glass partitions forming with the side walls a center compartment with similar compartments on each side thereof extending in the direction of elongation of said housing,
 (d) a right angle prism secured at each end of said center compartment and in optical alignment with each other,
 (e) a light entrance and exit optical means positioned at one end of said center compartment in optical alignment with said right angle prism at the opposite end of said center compartment,
 (f) and means for rotating said optical switch about an axis perpendicular to the direction of elongation of said housing.

2. An optical switch as claimed in claim 1 wherein:
 (a) each of said compartments include a gas therein of a specific index of refraction and at the same pressure, and
 (b) the index of refraction of said gas in said center compartment is greater than the index of refraction of said gas in each of the other compartments.

3. An optical switch as claimed in claim 2 wherein:
 (a) said light entrance and exit optical means is positioned at an angle relative to the direction of elongation of said housing.

4. An optical switch which comprises:
 (a) an elongated housing having side and end walls,
 (b) said housing comprising two parallel glass partitions therein extending through said housing in the direction of elongation thereof,
 (c) said glass partitions forming with the side walls a center compartment with similar compartments on each side thereof,
 (d) a right angle prism secured to said parallel glass partitions at each end thereof perpendicular to the linear axis in the direction of elongation of said housing in optical alignment with each other,
 (e) an optical glass window for admitting light into said center compartment at an angle of about three degrees relative to the longitudinal axis in the direction of elongation of said housing and in optical alignment with said right angle prisms,
 (f) an optical glass window for permitting light admitted into said center compartment to emerge from said optical switch,
 (g) a gas of a desired pressure contained in each of said compartments at the same pressure,
 (h) said gas in said center compartment being nitrogen with an index of refraction of about 1.000296,
 (i) said gas in each of said similar compartments on each side of said center compartment being oxygen with an index of refraction of about 1.000272,
 (j) and means of rotating said optical switch about an axis perpendicular to the linear axis in the direction of elongation of said elongated housing at about 1000 revolutions per second.

5. An optical switch as claimed in claim 4 wherein:
 (a) an adjusting means is provided on said housing for adjusting said gas pressure in each of said compartments thereby changing the index of refraction of the gas in each of said compartments.

References Cited

Benson, R. C., Godwin, R. O., and Mirarchi, M. R., "New Laser Technique for Ranging Application," NEREM Record, pp. 34–35, Nov. 5, 1962.

JEWELL H. PEDERSEN, *Primary Examiner.*

P. R. MILLER, *Assistant Examiner.*